Patented May 28, 1940

2,202,637

UNITED STATES PATENT OFFICE 2,202,637

MANUFACTURE OF THORIUM OXIDE AND CONTACT MASSES THEREFROM

Richard Müller and Harry Lee, Radebeul, near Dresden, Germany, assignors to Chemische Fabrik von Heyden, A. G., Radebeul, near Dresden, Germany, a corporation of Germany No Drawing. Application October 28, 1937, Serial No. 171,482. In Germany October 29, 1936

7 Claims. (Cl. 23—21)

This invention relates to an improved manufacture of thorium oxide and it especially relates to the manufacture of contact masses containing thorium oxide in a highly reactive form from thorium oxalate.

By thermal decomposition of pure thorium oxalate and, as will be shown hereinafter, of complexes containing thorium oxalate to produce thorium oxide there are obtained different oxides according to the conditions:

1. The decomposing temperature above 700° C.: "Dead burnt oxide" which cannot be peptised by means of dilute acid and does not dissolve as an ionic dispersion when heated in concentrated hydrochloric or nitric acid (see Kohlschütter and Frey, Zeitschrift für Elektrochemie, vol. 22, page 147).

2. Decomposing temperature below 740—about 500° C.: Satisfactorily peptised with dilute acids; does not become soluble oxide capable of ionic dispersion when treated with concentrated hydrochloric or nitric acid; no luminescence; Röntgenogram according to Debye and Scherrer: sharp interference lines, also crystal lattice of a high order (Kohlschütter and Frey, loc. cit. page 147).

3. Decomposing temperature 500–285° C. and lower: As the temperature is lowered the tendency to peptise decreases, but the ionic dispersion solubility increases as luminescence increases. The Röntgenogram according to Debye and Scherrer gives quite indistinct interference lines only perceptible with difficulty. The crystal lattice is scarcely formed wherefore the oxide is chemically and physically strongly reactive. The oxide obtained at 285° C. is no longer capable of peptisation; by observing certain conditions with regard to time the oxide is satisfactorily soluble as an ionic dispersion.

If it is desired to obtain the oxides characterised under (3), it is necessary, as more explicitly stated in U. S. Patent No. 2,099,325, to Rudolf Zellmann and Richard Müller, to consider the duration of the heating as well as the temperature.

Thus, one must heat at the lowest possible temperature in order to ensure substantially good decomposition. At a certain period of time the crystal lattice of the thorium oxalate is then destroyed; the crystal lattice of the thorium oxide, however, is either not formed at all or only in incomplete order. At this moment the physical condition of the thorium oxide is especially labile and the oxide, therefore, especially reactive. On heating further the crystal lattice is of better order, the physical condition of the oxide is more stable; the oxide loses its high reactivity.

By raising the temperature both the speed of the decomposition and also the progress of formation in the crystal lattice are increased; the oxide ages. The labile and therefore especially reactive condition of the thorium oxide named above is then more quickly attained but also more quickly passed, so that with rising temperature it is always more difficult to interrupt the process of decomposition so as to obtain a highly reactive oxide.

One can, as has been shown in the Zellmann and Müller patent above referred to, so define the progress of the decomposition reaction and the attainment of the especially labile crystal lattice that the thorium oxide obtained becomes soluble in concentrated hydrochloric acid or nitric acid forming a true salt, which is not coagulated by acids, whereas thorium oxide prepared according to Mellor "Comprehensive Treaties on Inorganic and Theoretical Chemistry," vol. VII, pages 221 and 223, dissolves in water, forming an opalescent sol which is coagulated by acids. An oxide produced by heating for 26 hours at 285° C. dissolves completely in the course of 10–18 minutes boiling in 3–4 times its weight of concentrated nitric acid (specific gravity=1.4), to produce thorium nitrate. If the oxalate is heated for too short a time, the dissolution requires a longer period, since the oxalate has not been sufficiently decomposed. By heating to higher temperatures the oxalate is more quickly decomposed. The ageing, however, also rises. At higher temperatures the duration of heating must be shortened as much as possible in order not to render the oxide insoluble owing to ageing.

In the temperature range between 280 and 450° C. the duration of the decomposition can be so adjusted on the foregoing principle that a labile thorium oxide is obtained which is especially reactive. According to the form and pretreatment of the heated thorium oxalate the formation of this highly reactive oxide may be shifted with respect to temperature and time.

In the temperature region of about 300° C. the phenomena are particularly distinct and it is easy to produce a highly reactive oxide.

The decomposition of the thorium oxalate differs at these low temperatures also from the reaction at about 450° C. in that at the lower temperature at no period of the decomposition is carbon produced (compare Kohlschütter and Frey, loc. cit. page 147, Fortschritte auf dem Gebiet der Röntgenstrahlen 37, page 22).

In the region of 450–500° C. the phenomena of (2) and (3) overlap each other. Only below 450° C. is it possible to obtain oxides which dissolve quickly and completely in concentrated nitric acid.

The present invention is based on the observation that the statements concerning thorium oxalate apply also to complex salts which contain thorium oxalate. It is known that thorium oxalate is soluble in complex manner, for example in a solution of ammonium oxalate, sodium carbonate or ammonium carbonate. When these solutions are cautiously evaporated the corresponding complex salt is obtained. With these thorium oxalate complex salts one can obtain by observing the foregoing mode of operation thorium oxide with labile and therefore especially reactive crystal lattice construction. This can be demonstrated also by the solubility in acid.

The following examples illustrate the invention:

EXAMPLE 1

Thorium-ammonium oxalate is heated at 285° C. The interdependence between duration of heating and duration of dissolving is shown in the following table. After the various heating periods samples were heated to boiling with about 4 times their weight of nitric acid (specific gravity=1.4).

Table I

| Duration of heating | Duration of dissolving in about 4 times the weight of $HNO_3$ (specific gravity=1.4) |
|---|---|
| Hours | |
| 16 | After 2 hours was not dissolved. |
| 18 | After 1 hour was not dissolved. |
| 19 | After 1 hour was not dissolved. |
| 20 | After 24 minutes was partially dissolved. |
| 21 | After 22 minutes was partially dissolved. |
| 22 | After 18 minutes was completely dissolved. |
| 23 | After 16 minutes was completely dissolved. |
| 24 | After 14 minutes was completely dissolved (most labile oxide). |
| 25 | After 21 minutes was completely dissolved (beginning of ageing). |

EXAMPLE 2

Thorium oxalate is dissolved in ammonium carbonate solution, the solution is filtered and evaporated and the solid residue is heated at 285° C.

Table II

| Duration of heating | Duration of dissolving in about 4 times the weight of $HNO_3$ (specific gravity=1.4) |
|---|---|
| Hours | |
| 21 | After 95 minutes was completely dissolved. |
| 22 | After 75 minutes was completely dissolved. |
| 23½ | After 60 minutes was completely dissolved. |
| 24½ | After 50 minutes was completely dissolved. |
| 25½ | After 42 minutes was completely dissolved. |
| 26½ | After 36 minutes was completely dissolved (most labile oxide). |
| 27½ | After 50 minutes was completely dissolved (beginning of ageing). |

EXAMPLE 3

Thorium-ammonium oxalate referred to in Example 1 is heated at 400° C.

Table III

| Duration of heating | Duration of dissolving in about 4 times the weight of $HNO_3$ (specific gravity=1.4) |
|---|---|
| Hours | |
| 4 | After 3¼ hours was fully dissolved. |
| 5 | After 2¾ hours was fully dissolved (labile oxide). |
| 7 | After 4 hours still not dissolved (already considerably aged). |

It will be seen, therefore, that with rising temperature the time of dissolution is very rapidly prolonged and that the increased speed of the ageing makes it difficult to obtain an especially freely soluble oxide.

When one heats substantially above 400° C. there occurs in addition to the ageing a separation of carbon as a further disturbance. The oxide is black-grey. By heating longer for the purpose of removing the carbon the ageing proceeds so rapidly that the oxide becomes insoluble until complete combustion of the carbon occurs.

In experiments on a large scale the operation is conducted if desired under diminished pressure or in a stream of gas, for instance air, carrying away the gaseous products of decomposition. By this mode of operating it is possible, therefore, in the manufacture of thorium nitrate from monazite sand (see B. R. Böhm, "Die Fabrikation der Glühkörper für Gasglühlicht," Halle 1910, page 24) to convert the thorium oxalate dissolved in ammonium carbonate for purification directly into thorium nitrate. There is thus avoided the unsatisfactory filtration of the highly voluminous or very fine-grained almost colloidal precipitate which is, therefore, collected with difficulty.

The high reactivity of the oxides is exhibited by their specially good effects when used as catalysts. The oxides obtained may be worked up into contact masses. But in order that the highly active thorium oxide may be distributed in the finest possible state of subdivision on the largest possible surface, it is necessary in order to save the costly thorium oxide, to impregnate intimately known carrier substances like pumice, silica gel, bentonite, fuller's earth, clay, xerogels of oxyhydrates or the like with the high reactive oxide.

This is easy when a thorium oxalate complex is used. For making impregnated contact carriers for use as catalysts the following procedure may be followed:

EXAMPLE 4

100 parts by weight of granular pumice having suitably large pores are heated for 1½ hours at 200° C. The pumice is then, while still warm, immersed in a saturated solution at 60° C. of ammonium carbonate in which also at 60° C., 80 parts of thorium oxalate has been dissolved. The whole is evaporated to dryness and sifted from powdery constituents if desired. The product is then heated for 24 hours at 315° C.

There is obtained a very active contact mass which contains on a carrier especially reactive thorium oxide in fine state of subdivision.

What we claim is:

1. A process of manufacturing highly reactive thorium oxide from thorium oxalate, which consists in heating to a temperature of about 285° C. to about 450° C. a complex salt containing thorium oxalate and a compound selected from the group comprising ammonium carbonate, ammonium oxalate and sodium carbonate, said heating being for such a period of time that a sample taken from the heated mass becomes soluble in boiling concentrated nitric acid in the minimum time.

2. A process of manufacturing a catalyst including a carrier and highly reactive thorium oxide, which consists in heating a carrier substance which has been impregnated with a complex salt consisting of thorium oxalate and a salt selected from the group consisting of ammonium carbonate, ammonium oxalate and sodium carbonate, said heating being to a temperature of about 285° C. to about 450° C.

3. A process of manufacturing a catalyst including a carrier and highly reactive thorium oxide, which consists in heating a carrier substance which has been impregnated with a complex salt consisting of thorium oxalate and a salt selected from the group consisting of ammonium carbonate, ammonium oxalate and sodium carbonate, said heating being to a temperature of about 285° C. to about 450° C., and for such a period that the solubility of the formed thorium oxide in boiling concentrated nitric acid has reached its culminating point.

4. The process of manufacturing highly reactive thorium oxide, which consists in heating a complex ammonium thorium oxalate to a temperature of about 285° C. for twenty-two to twenty-four hours.

5. Process of manufacturing highly reactive thorium oxide, which consists in heating a complex salt containing thorium oxalate and ammonium carbonate to a temperature of about 285° C. for 25-27 hours.

6. Process of manufacturing highly reactive thorium oxide, which consists in heating a complex ammonium thorium oxalate to a temperature of about 400° C. for 4-7 hours.

7. A catalyst including a carrier and highly reactive thorium oxide formed on and distributed over the surface of the carrier by heating a carrier substance which has been impregnated with a complex salt consisting of thorium oxalate and a salt selected from the group consisting of ammonium carbonate, ammonium oxalate and sodium carbonate, said heating being to a temperature of about 285° C. to about 450° C. for such a period of time that the formed thorium oxide will dissolve in boiling concentrated nitric acid in substantially the minimum time.

RICHARD MÜLLER.
HARRY LEE.